United States Patent [19]
Manchester

[11] 3,904,214
[45] Sept. 9, 1975

[54] FLUID OPERATED COMPENSATING CHUCK

[75] Inventor: William James Manchester, Durham, Conn.

[73] Assignee: Power Hold Products, Inc., Rockfall, Conn.

[22] Filed: Jan. 9, 1974

[21] Appl. No.: 431,687

[52] U.S. Cl. .................... 279/4; 279/1 J; 279/110
[51] Int. Cl.² .......................................... B23B 31/30
[58] Field of Search .......... 279/4, 110, 1 J; 269/25, 269/26

[56] References Cited
UNITED STATES PATENTS

| | | | |
|---|---|---|---|
| 2,587,893 | 3/1952 | Pridy et al. | 279/4 |
| 3,076,662 | 2/1963 | Kostyrka | 279/4 |
| 3,814,448 | 6/1974 | Buck | 279/110 |

*Primary Examiner*—Gil Weidenfeld
*Attorney, Agent, or Firm*—Prutzman, Hayes, Kalb & Chilton

[57] ABSTRACT

A power actuated compensating chuck is provided wherein the jaws are operated through an intermediate hydraulic circuit actuated by a power actuator. The chuck is comprised of a chuck body having a plurality of radially extending jaw guideways and master jaws slideably mounted in the guideways for reciprocal movement therealong between retracted and actuated positions. Each jaw is provided with an internal cylinder and a stationary piston mounted within each cylinder and fixed to the chuck body. A first fluid passageway is provided in each jaw in communicating relationship with the cylinder and moveable therewith. A second fluid passageway is fixedly positioned relative to the chuck body and is directly connected to the first fluid passage through a fluid-tight telescopically slideable seal to permit relative movement between the passageways during reciprocal movement of the master jaw. A power actuator associated with the second fluid passage is operable for pressurizing fluid within said first and second passageways and said cylinder to drive the master jaws between their retracted and actuated positions.

8 Claims, 3 Drawing Figures

PATENTED SEP 9 1975  3,904,214
FIG.1
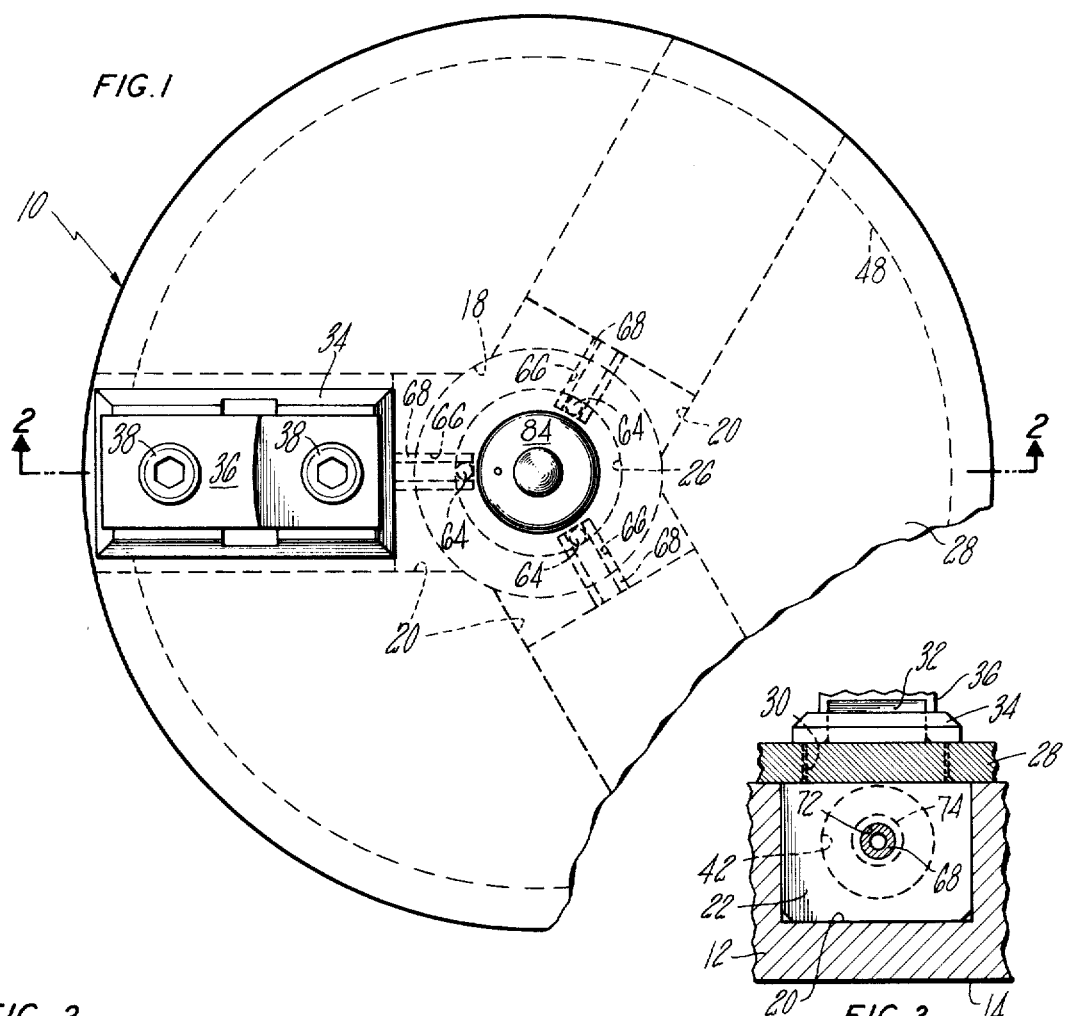
FIG.3
FIG.2
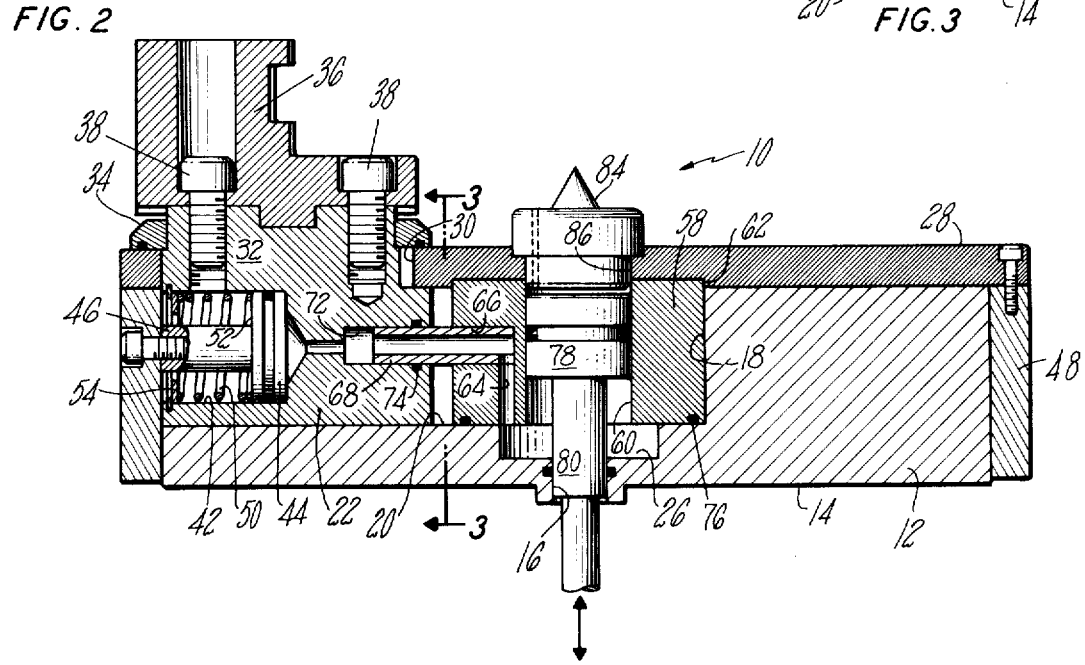

3,904,214

FLUID OPERATED COMPENSATING CHUCK

BACKGROUND AND SUMMARY OF THE INVENTION

The present invention relates generally to clamping devices such as chucks and the like. More particularly it is concerned with a new and improved fluid operated compensating chuck for clamping articles of slightly irregular configuration.

Power operated chucks and mechanical compensating chucks have been known for some time. However, design problems have constantly hampered efforts to commercially produce a power operated chuck where the individual jaws were operated hydraulically. Similarly mechanical compensating chucks are subject to many disadvantages; for example, they necessarily introduce power absorbing friction that tends to reduce the compensating action of the jaws. Additionally such devices exhibit a tendency to drive the work piece off the center axis of the chuck or cause distortion therein. Accordingly, an object of the present invention is to provide a fluid operated compensating chuck of simplified design wherein the individual jaws can compensate for an irregularly configured workpiece while simultaneously maintaining the piece in an appropriate centered position for machining and other work operations.

Another object of the present invention is to provide a new and improved compensating chuck of the type described that provides a closed, self-contained, fluid operated circuit that acts directly on the master jaws of the chuck to provide pressure equalization and firm clamping action of the workpiece irrespective of its configuration. Included in this object is the provision for separate power actuation of the fluid operated circuit that controls operation of the jaws.

A further object is to provide a compensating chuck of the type described that provides greater gripping force, particularly at high speed operation, coupled with high efficiency based on the power actuating force required.

Still another object is to provide a fluid operated chuck wherein a closed hydraulic circuit operates through a sliding seal in the master jaws of the chuck to provide pressure equalization adapted for accommodating slight irregularities in the workpiece.

A still further object is to provide a chuck that achieves the foregoing while simultaneously minimizing and simplifying the fluid drive system associated therewith and maintaining the necessary sturdy and rugged construction requirements of such devices.

Other objects will be in part obvious and in part pointed out in more detail hereinafter.

These and related objects are accomplished in accordance with the present invention by providing a power operated compensating chuck wherein the jaws are operated through an intermediate fluid circuit. The chuck is comprised of a chuck body having a plurality of radially extending slots forming jaw guideways and master jaws slideably mounted in each of the slotted guideways for reciprocal movement therealong between retracted and actuated positions. Each jaw is provided with an internal cylinder and a stationary piston is mounted within each cylinder and fixed to the chuck body. A first fluid passageway is provided in each jaw in communicating relationship with the cylinder and moveable therewith relative to the stationary piston and chuck body. A second fluid passageway is fixedly positioned relative to the chuck body and is directly connected to the first fluid passage to permit relative movement therebetween during reciprocal movement of the master jaw. A power actuator associated with the second fluid passage is operable for pressurizing fluid within said first and second passages and said cylinder to drive the master jaw between its retracted and actuated positions.

A better understanding of the invention will be obtained from the following detailed description and the accompanying drawing which set forth an illustrative embodiment indicative of the way in which the principles of the invention are employed.

A BRIEF DESCRIPTION OF THE DRAWING

In the drawing:

FIG. 1 is a plan view of a face portion of a chuck incorporating the features of the present invention, the chuck being shown in its retracted or open position;

FIG. 2 is a sectional view, partly broken away and partly in section, taken along the lines 2—2 of FIG. 1; and, FIG. 3 is a sectional view taken along the line 3—3 of FIG. 2.

DESCRIPTION OF A PREFERRED EMBODIMENT

Referring now to the drawing in greater detail wherein like reference numerals indicate like parts within each of the figures, a chuck 10 is shown as being comprised of a thick disc-like chuck body 12 having a substantially flat back face 14 well suited for mounting on the spindle of a number of different machine tools. The chuck body is provided with a central or axial aperture 16 in the back face thereof and a substantially enlarged circular recess 18 coaxial with the aperture 16 and extending from the face opposite the back face 14 through a substantial depth of the chuck body 12. As best shown in FIG. 1 three symmetrically spaced slots 20 extend radially outwardly from the central recess 18 to the periphery of the chuck and are suitable configured so as to provide raceways for the master jaws 22 of the chuck. As is conventional, the three slotted raceways 20 and corresponding jaws 22 are substantially identical. Accordingly, the details relating to only one such slotted raceway 20 and master jaw 22 are illustrated in detail in the drawing.

The large central recess 18 within the chuck body 12 is further provided with a circular coaxial depression 26 extending toward the back face 14 of the chuck body below the plane of the radial raceways 20. The depression 26 is of smaller diameter than the enlarged recess 18 and is of suitable size so as to act as a common reservoir or connector for the hydraulic fluid used in actuating the master jaws 22 of the chuck.

The master jaws 22 are slideably positioned within the respective raceways for radial movement therealong into and out of the retracted or open position shown in the drawing. A circular top plate 28 covers the face of chuck body 12 opposite its back face 14 and partially encloses the raceways 20 and the master jaws 22 mounted therein. The plate 28 is provided with three generally rectangular apertures 30 symmetrically spaced adjacent its periphery so as to be in registry with the slotted raceways 20. The rectangular apertures 30 are of smaller dimensions than the slotted raceways but are of sufficient transverse dimension to accommodate a projecting top portion 32 of the master jaw 22 and of sufficient length to permit limited radial movement of the master jaws 22 along the raceway 20 relative to the supporting chuck body 12. A sealing shield 34 extends along the perimeter of the projecting jaw portion 32 and appropriately covers and fully encloses the rectangular opening 30 within the top plate 28 so that metal shavings and other undesirable materials will not inadvertently be admitted into the slotted raceways 20. Additionally suitable jaw attachments of various configurations and/or adapted to special applications, such as the attachment 36, can be firmly secured to the projecting portion 32 of the master jaw by means of threaded fasteners 38.

As mentioned, the master jaws 22 are positioned in the raceways 20 for reciprocal travel in a radial direction relative to both the chuck body 12 and the top plate 28. As shown in FIG. 2 each master jaw 22 is provided with a relatively large cylindrical bore 42 extending longitudinally from the outer end thereof. A stationary piston 44 is mounted within each bore or cylinder 42 and is secured through its elongated stem 46 to a chuck body ring 48 which circumscribably encloses the perimeter of the chuck body 12 and is appropriately secured thereto and to the top plate 28. A compression return drive spring 50 is mounted over the piston stem 46 and abuts the rear surface 52 of the piston at one end and a retaning washer 54 at the other end, the washer 54 being keyed to the master jaw 22 for movement therewith. Thus, as will be appreciated, the stationary piston 44 is immovably secured to the enclosing chuck body ring 48 and movement of the master jaw 22 to the right as viewed in FIG. 2 will further load the return spring 50 so that when the driving force acting on the master jaw 22 is released, the spring 50 will be effective to driveably return it to its retracted or open position illustrated in the drawing.

A chuck core ring 58 having an axial aperture 60 and a peripheral outer wall 62 of substantially the same diameter as the enlarged recess 18 is securely mounted within the recess 18 and is provided with three symmetrically spaced, axially extending pasageways 64 located so as to communicate at one end with the reservoir 26 for the hydraulic fluid and at the other end with respective radially extending slots 66 disposed so as to be in registry with the axes of their respective slotted raceways 20. An elongated tube 68 is firmly mounted within each radially extending slot 66 and projects outwardly therefrom for a distance substantially greater than the distance of travel provided for the master jaws 22.

Each master jaw is also provided with a longitudinal counterbored passageway 72 extending from the innermost end thereof toward the cylinder 42 and providing fluid communication with the cylinder. The tube 68 mounted in the core ring 58 is telescopically received within the counterbored passageway 72 of the master cylinder and completes the hydraulic circuit between the common reservoir 26 and each cylinder 42. As shown in FIGS. 2 and 3 suitable fluid seals 74 are provided between the passageways 72 of the master jaws 22 and the telescoping, radially extending tubes 68 mounted within the core ring 58 and a seal 76 is provided between the core ring 58 and the chuck body 12 radially outwardly of the reservoir 26. A piston 78 of a suitable drive actuator (not shown) is positioned within the axially extending aperture 60 of the core ring 58 at a location above the reservoir 26 and is driven in a reciprocal fashion by means of a suitable air or hydraulic actuator connected to the piston drive shaft 80 extending through the center aperture 16 in the chuck body 12. In conventional fashion the piston 78 of the power drive actuator is drawn toward the reservoir 26 during its power stroke. As the piston thus moves, it compresses the hydraulic fluid within the closed, self-contained hydraulic circuit and creates sufficient pressure throughout the circuit so that the hydraulic fluid acts upon the walls of the cylinders 42 and on the stationary pistons 44 to drive the master jaws 22 radially inwardly along the raceways 20. The retaining washers 54 are driven inwardly with the jaws to load the return drive springs 50 so that when the power actuator releases the central piston 78, the return drive springs 50 will be effective to return the master jaws 22 to the illustrated retracted position.

Where desired, a suitable center point, such as the center point 84, or other suitable workpiece adapter may be mounted within a central aperture 86 in the top plate 28 or, alternatively, connected to the piston 78 of the power operator. A workpiece may be mounted on the center point 84 so as to appropriately locate the proper machining orientation of the workpiece on the chuck while the chuck is in its open position. Thereafter operation of the power actuator will draw the center piston 78 toward the reservoir 26 causing the master jaws 22 to move radially inwardly. If the workpiece is of slightly irregular configuration, one of the three jaws may contact the workpiece before contact is made by the other jaws. However, the jaw contacting the workpiece will not substantially bear thereagainst since the pressure within the hydraulic fluid is equalized within the system and the contacting jaw will be held stationary while the inward radial advance of the remaining jaws continues until all three jaws have been brough into contact with the workpiece. Only after this compensating action is completed and all three jaws have contacted the workpiece will sufficient additional pressure be applied simultaneously to all three jaws to provide the desired firm clamping action. Thus, the intermediate hydraulic system of the present invention permits compensation in jaw movement to accommodate an irregularly configured workpiece without displacing that workpiece from its desired centered position. The compensating chuck achieves this desirable result by the hydraulic fluid passing through a portion of the moveable master jaw and directly acting thereon to move the jaw. As will also be appreciated, this permits high gripping force only after centering has been assured.

As will be appreciated by persons skilled in the art, various modifications, adaptations and variations of the foregoing specific disclosure can be made without departing from the teachings of the present invention.

I claim:

1. A fluid operated compensating chuck comprising a chuck body having a plurality of radially extending jaw guideways, master jaws slideably mounted in each of said guideways for reciprocal movement therealong between an actuated position and a retracted position, each of said jaws having a cylinder therein, a stationary piston mounted within each cylinder and fixedly secured to the chuck body, a first fluid passage in each jaw communicating with the cylinder and moveable therewith relative to the chuck body and the stationary piston, a second fluid passage for each jaw fixedly secured to said chuck body and directly interconnected to the first fluid passage to permit relative movement therebetween upon reciprocal movement of the master jaws and a fluid actuator associated with said second fluid passages for pressurizing fluid in said passages and said cylinders and driving the jaws toward their actuated positions.

2. The compensating chuck of claim 1 wherein said guideways are symmetrically spaced slots within said chuck body, said jaws being normally biased toward their retracted positions adjacent the periphery of said chuck body.

3. The compensating chuck of claim 1 including an enlcosed common reservoir for the operating fluid communicating with the individual cylinders through said first and second passages.

4. The compensating chuck of claim 1 wherein said first and second fluid passages are in fluid-tight telescopic sliding relationship and in alignment with the direction of travel of said jaws during reciprocal movement.

5. The compensating chuck of claim 1 including a common reservoir for the operating fluid, said cylinders as well as the first and second passages and the reservoir forming a closed fluid circuit for operating said cylinders, said fluid actuator being power operated for acting on the fluid in the common reservoir for pressurizing said fluid.

6. The compensating chuck of claim 5 wherein the closed fluid circuit is a hydraulic circuit.

7. The compensating chuck of claim 1 wherein said chuck includes a return drive spring operatively connecting said master jaws to said stationary piston for normally biasing said jaws toward said retracted position, said chuck including a peripheral ring enclosing one end of said guideways and fixedly mounting said pistons.

8. The compensating chuck of claim 1 wherein said jaw guideways are symmetrically spaced slots within said chuck body extending from adjacent the periphery thereof, said chuck including biasing means operatively associated with said master jaws for normally biasing said jaws toward said retracted position, said chuck body including an axial positioned common fluid reservoir connected to said cylinders through said first and second passages, said first actuator being positioned at the axis of the chuck body and being axially operable on the fluid within said common reservoir for driving said jaws toward their actuated position, said first and second fluid passages being in telescopic sliding relationship with one another and having a fluid-tight seal therebetween.

* * * * *